United States Patent
Venalainen

(10) Patent No.: US 10,625,318 B2
(45) Date of Patent: Apr. 21, 2020

(54) STRAIGHTENING APPARATUS

(71) Applicant: Olavi Venalainen, Kuopio (FI)

(72) Inventor: Olavi Venalainen, Kuopio (FI)

( * ) Notice: Subject to any disclaimer, the term of this patent is extended or adjusted under 35 U.S.C. 154(b) by 0 days.

(21) Appl. No.: 15/527,350

(22) PCT Filed: Nov. 17, 2015

(86) PCT No.: PCT/FI2015/050798
§ 371 (c)(1),
(2) Date: May 17, 2017

(87) PCT Pub. No.: WO2016/079384
PCT Pub. Date: May 26, 2016

(65) Prior Publication Data
US 2017/0355004 A1    Dec. 14, 2017

(30) Foreign Application Priority Data

Nov. 20, 2014 (FI) ...................... 20146018

(51) Int. Cl.
*B21D 1/12* (2006.01)
*B21D 1/14* (2006.01)
*F16G 15/00* (2006.01)

(52) U.S. Cl.
CPC ............. *B21D 1/12* (2013.01); *B21D 1/14* (2013.01); *F16G 15/00* (2013.01)

(58) Field of Classification Search
CPC .. B21D 1/12; B21D 1/14; B21D 1/145; Y10S 72/705
See application file for complete search history.

(56) References Cited

U.S. PATENT DOCUMENTS

| 3,340,720 | A | * | 9/1967 | Chartier | B21D 1/14 72/705 |
| 3,955,397 | A | * | 5/1976 | Meis | B21D 1/14 72/442 |
| 4,183,511 | A | * | 1/1980 | Marek | B66C 23/48 254/100 |
| 4,643,015 | A | * | 2/1987 | Larson | B21D 1/14 72/305 |
| 4,827,759 | A | | 5/1989 | Mattson | |

(Continued)

FOREIGN PATENT DOCUMENTS

| CN | 1116831 A | 2/1996 |
| CN | 1054083 C | 7/2000 |

(Continued)

*Primary Examiner* — Teresa M Ekiert
(74) *Attorney, Agent, or Firm* — Harrington & Smith

(57) ABSTRACT

The inventions relates to a straightening apparatus for straightening body panels of a vehicle, which straightening apparatus includes a support beam, a straightening fastener fastened to the support beam which fastener is fastenable to the body panels of the vehicle, a transfer device for moving the straightening fastener in relation to the vehicle to straighten body panels, and at least two support elements for supporting the support beam during straightening work. In the straightening apparatus according to the invention, the support beam includes a vertical beam and an extension beam movably fastened to it, and the first support element is movably fastened to the vertical beam and the second support element is fastened to the extension beam.

4 Claims, 2 Drawing Sheets

(56) References Cited

U.S. PATENT DOCUMENTS

Figure 1:
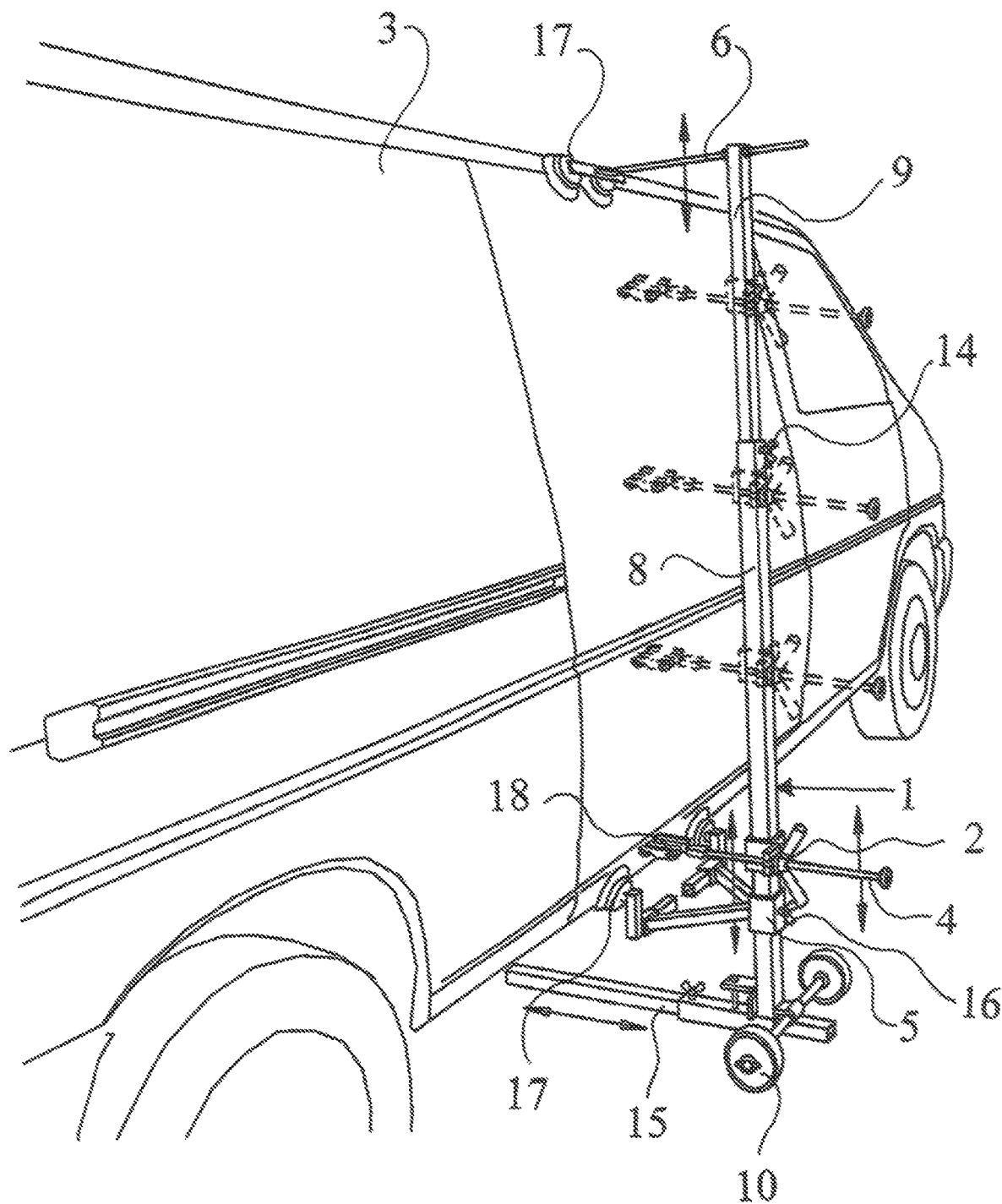

| | | | |
|---|---|---|---|
| 4,916,933 A | | 4/1990 | Celette .......................... 72/457 |
| 4,932,639 A | * | 6/1990 | Fjellstrom ................ B66F 3/08 |
| | | | 254/100 |
| 5,915,742 A | * | 6/1999 | Hung ...................... B25B 11/02 |
| | | | 269/17 |
| 6,490,906 B1 | | 12/2002 | Bailey |
| 6,957,559 B2 | | 10/2005 | Venalainen |
| 2006/0016240 A1 | | 1/2006 | Uegaki |

FOREIGN PATENT DOCUMENTS

| | | |
|---|---|---|
| CN | 1058646 C | 11/2000 |
| CN | 1708366 A | 12/2005 |
| JP | H-0826 U | 1/1996 |
| JP | H-0890073 A | 4/1996 |
| JP | H08 206736 A | 8/1996 |
| JP | 2002086212 A | 3/2002 |
| WO | WO-9626152 A1 | 8/1996 |
| WO | WO-9809742 A1 | 3/1998 |
| WO | WO-9901238 A1 | 1/1999 |

\* cited by examiner

STRAIGHTENING APPARATUS

The inventions relates to a straightening apparatus for straightening body panels of a vehicle, which straightening apparatus includes a support beam, a straightening fastener fastened to the support beam which fastener is fastenable to the body panels of the vehicle, a transfer device for transferring the straightening fastener in relation to the vehicle to straighten the body panels, and at least two support elements for supporting the support beam during straightening work.

In crashes and also in other smallish accidents with vehicles, it is conventional that at least the body panels of vehicles are damaged and they become more or less dented. When a vehicle is repaired after a crash or some other incident, one work stage is straightening the body panels of the vehicle. Various tools and apparatuses are used for the straightening. One such an apparatus is a straightening apparatus which is fastened/supported on the body of the vehicle in the proximity of the damage or in the damaged area, and special fasteners are usually fastened at the point which has been dented most. After this, the straightening apparatus is used for pulling the body panel until is becomes straight.

In vehicles, there are many so-called strong lines at the point of which the vehicle has a framework below the body panels or seams of the body panels. These points are considerably robuster than the body panels alone. When straightening a vehicle, it is good to set supporting arms along these strong lines and at some other places or points in order for the support beam to stay in place during the straightening work. It is especially important that the support elements are such or at such a point that they will no move or give way during the straightening work.

The object of the invention is to introduce a straightening apparatus for straightening body panels of a vehicle which apparatus is easily installable into various positions and various points on top of the body panels of the vehicle. A further object of the invention is to introduce an apparatus which is versatile and easy to use.

The object of the invention is achieved with a straightening apparatus which is characterised by what is presented in the claims.

In a straightening apparatus according to the invention, a support beam includes a vertical beam and an extension beam movably fastened to it, and a first support element is movably fastened to the vertical beam and a second support element is fastened to the extension beam. By such a straightening apparatus, straightening work can be done easily, because the length of the support beam can be adjusted in a desired way. When the first support element is fastened movably and lockably to the vertical beam, it can be transferred in the vertical direction of the vehicle at a desired point, such as e.g. at the point of a framework or a seam, by moving it in relation to the vertical beam. When the second support element is fastened to the extension beam, it can be transferred in the vertical direction of the vehicle at a desired point, such as e.g. at the point of a framework or a seam, by moving the extension beam upwards or downwards in relation to the vertical beam. With such a straightening apparatus, the straightening work is easy to perform, because the length of the support beam and the positioning points of the support elements can be adjusted in a desired way. The support elements can be easily positioned at such a point that they cannot move or give way during the straightening work.

In an advantageous embodiment of the invention, the second support element is fastened at the end of the extension beam. By transferring the extension beam in relation to the vertical beam, the second support element can be positioned at a suitable place against the vehicle.

In an advantageous further embodiment of the invention, the vertical beam is provided with wheels, whereby it can be easily transferred on different sides of the vehicle at a desired point.

In a next advantageous embodiment of the invention, the straightening apparatus includes ramps, fastening beams fastenable to them adjustably in the longitudinal or crosswise direction and a cross beam fastened between the fastening beams close to their ends to which cross beam the support beam is fastenable. When the vehicle wheels are on top of the ramps and the support beam is fastened to the cross beam, the ramps constitute a second support element and the support beam cannot move during the straightening work.

Figure 2:
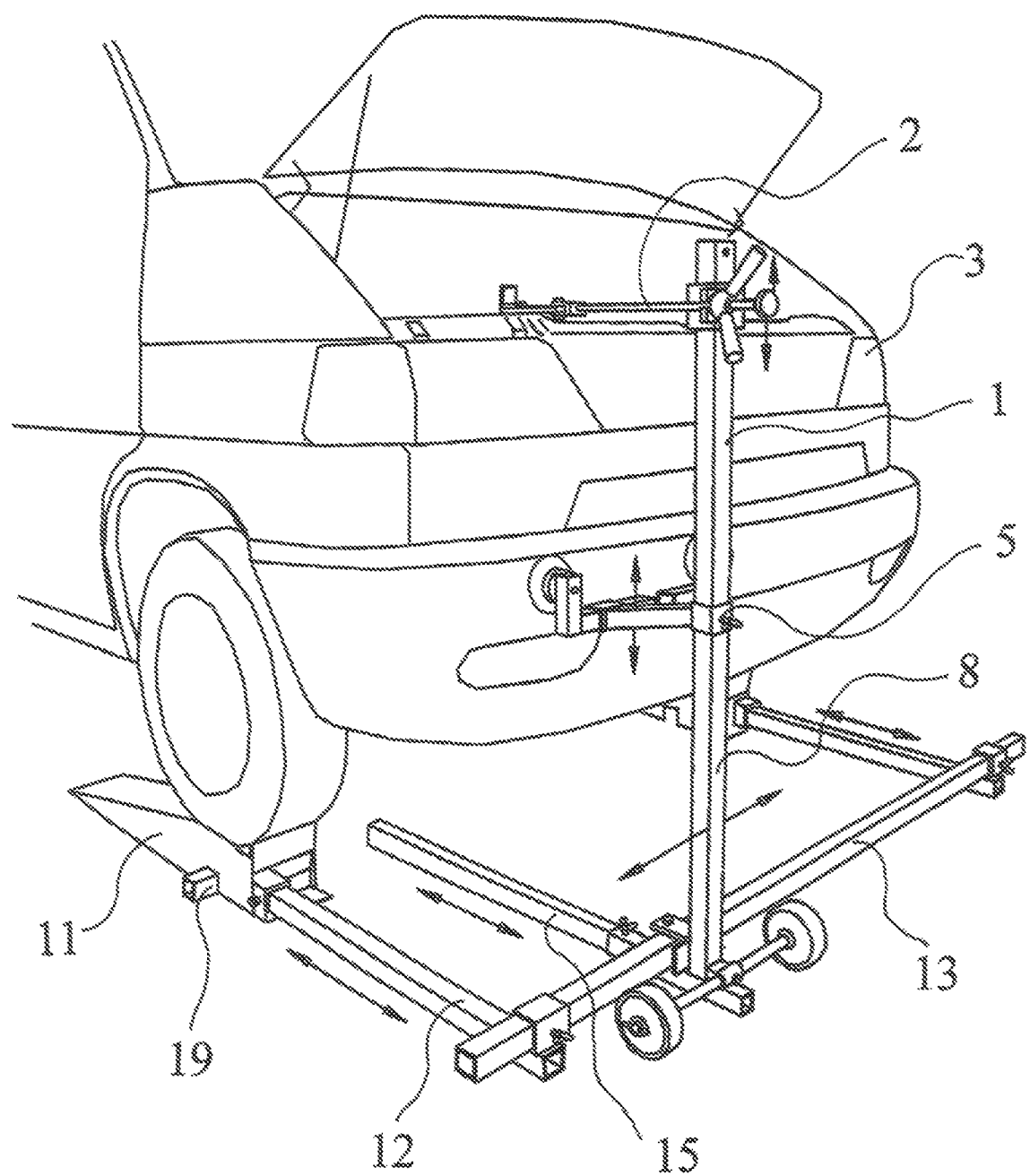

The invention will now be described in more detail with reference to the accompanying drawings in which FIG. 1 shows an oblique side view of an embodiment of a straightening apparatus according to the invention installed on the side of a vehicle, and FIG. 2 shows an oblique side view of another embodiment of a straightening apparatus according to the invention installed at the front of a vehicle.

The straightening apparatus according to FIG. 1 includes a support beam 1 which contains a vertical beam 8 and an extension beam 9 fastened to it telescopically and movably in its longitudinal direction. At the top part of the vertical beam 8, there is a locking element 14 for locking the extension beam 9 to the vertical beam 8. In this embodiment, the locking element 14 is a locking screw. At the bottom part of the vertical beam on its one side is fastened a shaft to which are fastened wheels 10. To the bottom part of the vertical beam is fastened a straightening support 15 extending in the opposite direction in relation to the wheels, which support includes a hollow frame fastened perpendicularly to the bottom part of the vertical beam and a support beam movable and lockable in relation to it.

The straightening apparatus also includes a lower support section 5 fastened to the vertical beam and operating as a support element. This support section is movable/transferable in relation to the vertical beam and lockable at a desired point in the vertical direction of the vehicle 3 in place by means of a locking element 16, such as a locking screw. At the end of the extension beam 9 is fastened a second, upper support section 6 operating as a support element. This support section is movable by means of the vertical beam and the extension beam at a desired height in relation to the vehicle. The support sections include two supports 17 provided with ball joints which supports are settable against the panels of the vehicle. The lower support section includes two support arms at the ends of which the fastening sections of the supports are fastened releasably and rotatably into different positions. The fastening sections of the supports can be rotated such that the supports can be set against the vehicle from the side, from above or from below. The upper support section includes an arm at the end of which there is a crosswise beam to which are fastened two supports.

Furthermore, the straightening apparatus includes a straightening fastener 2 movably fastened to the vertical beam and lockable to it at a desired point by a locking element and gripping elements 18 at its end for fastening onto the body panels of the vehicle. The straightening apparatus includes a transfer device 4 for transferring the gripping elements, which transfer device in this embodiment is an adjustable straightening screw. The gripping elements can be e.g. a hook, a catch, a suction pad or a pulling fork.

When using the straightening apparatus according to FIG. 1, the support beam 1 is first transferred in the horizontal direction at the point of the vehicle and its damage being repaired at a point suitable for straightening work and the support sections 5 and 6 are set at the points of beams being on the side of the vehicle and the straightening fastener 2 is transferred in the vertical direction at the point of the damage. In FIG. 1, the lower support section 5 is set at the point of the lower beam of the vehicle and the upper support section 6 is set at the point of the longitudinal upper beam of the vehicle. Then, the gripping elements 18 of the straightening fastener 2 are fastened on the body panel of the vehicle at a point suitable from the viewpoint of straightening work. FIG. 1 shows a straightening fastener fastened on a body panel being in the bottom part of the vehicle and dotted lines show its fastening to other heights. The straightening support 15 in the bottom part of the vertical beam has been pulled at a suitable length extending towards the vehicle. The straightening support supports itself on the chassis and keeps the straightening apparatus upright. The straightening work is started by tightening the straightening screw, whereby it pulls the body panel towards the vertical beam. The vertical beam stays in place because the support sections are against the body panel of the vehicle and support it.

In the embodiment according to FIG. 2, there is shown the vertical beam 1 according to FIG. 1 to which are fastened wheels and a straightening support. Furthermore, to the vertical beam are fastened movably in relation to it a support section 5 and a straightening fastener 2 which correspond the parts shown in FIG. 1. Additionally, the straightening apparatus includes ramps 11, fastening beams 12 adjustably fastenable to them in the longitudinal direction and a cross beam 13 fastened crosswise to the fastening beams in the vicinity of their ends. In the bottom part of the vertical beam, there are fastening elements for fastening the support beam 1 to the cross beam at a desired point.

The straightening apparatus according to FIG. 2 is intended to be used when straightening the body panels in the vehicle front or rear. As the straightening starts, the vehicle is transferred such that its front or rear wheels are on top of the ramps. In FIG. 2, the front wheels of the vehicle are on top of the ramps. After that, the fastening beams are transferred in relation to the ramps to set the cross beam at a desired point. Then, the vertical beam is fastened to the cross beam at a desired point in relation to the vehicle. Next, the support section is set at the point of the vehicle support beam or equivalent reinforced section and the straightening element is installed at a desired point. When the straightening apparatus is set in place, the straightening element is tightened by means of the screw and the body panel of the vehicle is pulled at a desired strength to straighten it. The vertical beam supports itself both on the ramps and the support section. The weight of the vehicle is applied on the ramps and they stay fastly in place and the fastening beams and the cross beam stay in place and also keep the vertical beam in place.

In the ramps according to FIG. 2, there also are on the sides fastening supports/sections 19 for fastening beams or equivalents on their sides. Thus if desired, the ramps can be used as a support for straightening work occurring on the sides of the vehicle if the straightening apparatus is supported in an equivalent way as in FIG. 2 to the ramps by means of the fastening beams and the cross beam.

The invention is not limited to the described advantageous embodiments, but it can vary within the scope of the inventive idea presented in the claims.

The invention claimed is:

1. A straightening apparatus for straightening body panels of a vehicle, which straightening apparatus comprises:
    a support beam including a vertical beam and an extension beam, the extension beam is movably fastened to the vertical beam in the vertical beam's longitudinal direction,
    a straightening fastener fastened to the support beam, a first end of the straightening fastener having gripping elements configured to grip a body panel of the vehicle,
    a lower support element, configured to contact the vehicle and support the vertical beam by keeping the vertical beam in place during straightening, is movably fastened to the vertical beam,
    an upper support element, configured to contact a vertical side of the vehicle and support the extension beam by keeping the extension beam in place during straightening, is fastened to the extension beam,
    a transfer device, fastened to the straightening fastener, configured to move the gripping elements in the first end of the straightening fastener with the gripped body panel towards the vertical beam while the upper and the lower support elements maintain the distance between the support beam and the vehicle, and
    the vertical beam is provided with wheels.

2. A straightening apparatus according to claim 1, wherein the upper support element is fastened at an end of the extension beam.

3. A straightening apparatus for straightening a body panel of a vehicle, where the straightening apparatus comprises:
    a support beam including a vertical beam and an extension beam, where the extension beam is movably fastened to the vertical beam in a longitudinal direction of the vertical beam;
    a straightening fastener fastened to the support beam, where a first end of the straightening fastener comprises gripping elements configured to grip the body panel of the vehicle;
    a lower support element movably fastened to the vertical beam, where the lower support element is configured to contact the vehicle, where the lower support element is configured to support the vertical beam by keeping the vertical beam in place during straightening;
    an upper support element fastened to the extension beam, where the upper support element is configured to contact the vehicle and support the extension beam by keeping the extension beam in place during straightening;
    a transfer device, fastened to the straightening fastener, configured to move the gripping elements in the first end of the straightening fastener with the gripped body panel towards the vertical beam while the upper and the lower support elements maintain a distance between the support beam and the vehicle;
    wheels connected to the vertical beam; and
    ramps, where fastening beams are adjustably fastened to the ramps in a longitudinal direction or a transverse direction, and a cross beam is fastened between the fastening beams in a vicinity of ends of the fastening beams, where the support beam is fastened to the cross beam.

4. A straightening apparatus for straightening a body panel of a vehicle, where the straightening apparatus comprises:
- a support beam including a vertical beam and an extension beam, where the extension beam is movably connected to the vertical beam in a longitudinal direction of the vertical beam;
- a straightening fastener connected to the support beam, where a first end of the straightening fastener comprises gripping elements configured to grip the body panel of the vehicle;
- a lower support element movably connected to the vertical beam, where the lower support element is configured to contact the vehicle, where the lower support element is configured to support the vertical beam by keeping the vertical beam in place during straightening;
- an upper support element connected to the extension beam, where the upper support element is configured to contact a vertical side of the vehicle and support the extension beam by keeping the extension beam in place during straightening;
- a transfer device, connected to the straightening fastener, configured to move the gripping elements in the first end of the straightening fastener with the gripped body panel towards the vertical beam while the upper and the lower support elements maintain a distance between the support beam and the vehicle; and
- at least one wheel connected to the vertical beam.

\* \* \* \* \*